(12) United States Patent
Tanji et al.

(10) Patent No.: US 7,516,054 B2
(45) Date of Patent: Apr. 7, 2009

(54) METHOD AND APPARATUS FOR NUMERICAL CALCULATION RELATED TO FLUIDS, PROGRAM FOR IMPLEMENTING THE METHOD, AND STORAGE MEDIUM STORING THE PROGRAM

(75) Inventors: Koichi Tanji, Kanagawa (JP); Akira Asai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/887,849

(22) Filed: Jul. 12, 2004

(65) Prior Publication Data

US 2005/0027498 A1 Feb. 3, 2005

(30) Foreign Application Priority Data

Jul. 31, 2003 (JP) ............................. 2003-205055

(51) Int. Cl.
*G06G 7/50* (2006.01)

(52) U.S. Cl. ......................................................... 703/9

(58) Field of Classification Search ...................... 703/2, 703/6, 9
See application file for complete search history.

(56) References Cited

U.S. PATENT DOCUMENTS 5,699,284 A * 12/1997 Muramatsu ..................... 703/1

OTHER PUBLICATIONS

The leapfrog method, http://sepwww.stanford.edu/sep/prof/bei/fdm/paper_html/node.14.html, Stanford Exploration Project Dec. 26, 2000.*
Haim Nessyahu et al., "Non-oscillatory Central Differencing for Hyperbolic Conservation Laws", Journal of Computational Physics 87, pp. 408-463, 1990.
Meng-Sing Liou et al., "A New Flux Splitting Scheme", Journal of Computational Physics 107, pp. 23-39, 1993.
Sin-Chung Chang, "The Method of Space-Time Conservation Element and Solution Element—A New Approach for Solving the Navier-Stokes and Euler Equations", Journal of Computational Physics 119, pp. 295-324, 1995.

* cited by examiner

*Primary Examiner*—Paul L Rodriguez
*Assistant Examiner*—Eunhee Kim
(74) *Attorney, Agent, or Firm*—Fitzpatrick, Cella, Harper & Scinto

(57) ABSTRACT

A method for numerical calculation related to fluids which is efficient and less liable to cause numerical diffusion and does not rely upon the functional form of an equation of state and hence can be used as a generalized numerical calculation method. A flux is divided into an advection part, a pressure-dependent part, and a dissipation part, according to physical properties thereof, to calculate a one-dimensional basic equation. A time evolution is executed on the advection part and the pressure-dependent part using an upwind difference type leap-frog difference method and a central difference type leap-frog difference method, respectively.

3 Claims, 6 Drawing Sheets

REGULAR GRID

CENTRAL DIFFERENCE GRID

REGULAR GRID

CENTRAL DIFFERENCE GRID

METHOD AND APPARATUS FOR NUMERICAL CALCULATION RELATED TO FLUIDS, PROGRAM FOR IMPLEMENTING THE METHOD, AND STORAGE MEDIUM STORING THE PROGRAM

CROSS REFERENCE TO RELATED APPLICATION

This application claims priority from Japanese Patent Application No. 2003-205055 filed Jul. 31, 2003, which is hereby incorporated by reference.

BACKGROUND OF THE INVENTION

1. Field of the Invention

The present invention relates to a method and apparatus for numerical calculation related to fluids such as a compressible fluid, a program for causing a computer to execute the method, and a storage medium storing the program.

2. Description of the Related Art

A numerical analysis method for a compressible fluid in general is roughly classified into an analysis method which makes much of upwinding, and an analysis method which does not make much of upwinding and designs the grid system, instead.

Recently, as an efficient and stable analysis method for compressible fluids, an AUSM (Advection Upstream Splitting Method) scheme has been proposed (refer to M. S. Liu and C. J. Steffen, Jr: A New Flux Splitting Scheme, Journal of Computational Physics, 107, 23-39 (1993), for example). According to this AUSM scheme, the pressure that causes non-linearity is dealt with separately, and the ultrasonic speed is evaluated according to the functional form of an equation of state in order to carry out pressure evaluation according to the Mach number On the other hand, as an analysis method which does not make much of upwinding, there have been proposed a central difference scheme (central scheme) (refer to H. Nessyahu, E. Tadmor, "Non-oscillatory central differencing for hyperbolic conservation laws" Journal of Computational Physics, 87, 408-463 (1990), for example), and the CE/SE scheme (refer to S. C. Chang "The Method of Space-Time Conservation Element and Solution Element—A New Approach for Solving the Navier-Stokes and Euler Equations" Journal of Computational Physics, 119, 295-324 (1995), for example). According to these schemes, a dual grid system is used to carry out calculation in the central difference scheme, and a plurality of grid systems are used to carry out calculation in the CE/SE scheme, since a conservation law in time and space is considered.

The AUSM scheme requires evaluation of the ultrasonic speed according to the functional form of the equation of state, and the central difference scheme and the CE/SE scheme require the use of a plurality of grid systems which have large calculating loads and are liable to cause numerical diffusion.

SUMMARY OF THE INVENTION

It is an object of the present invention to provide a method and apparatus for numerical calculation related to fluids, which is efficient and less liable to cause numerical diffusion and does not rely upon the functional form of an equation of state and hence can be used as a generalized numerical calculation method, a program for implementing the method, and a storage medium storing the program.

To attain the above object, in a first aspect of the present invention, there is provided a method for numerical calculation related to a fluid comprising a dividing step of dividing a flux into a plurality of flux parts according to physical properties thereof, to calculate a conservative equation, and a time evolution executing step of executing time evolution on at least part of the plurality of flux parts using both an upwind difference type leap-frog difference method and a central different type leap-frog difference method.

To attain the above object, in a second aspect of the present invention, there is provided a method for numerical calculation related to a fluid comprising a dividing step of dividing a flux into an advection part and a pressure-dependent part, to calculate a conservative equation, a first time evolution executing step of executing time evolution on the advection part using an upwind difference type leap-frog difference method based on flow velocity, and a second time evolution executing step of executing time evolution on the pressure-dependent part using a central difference type leap-frog difference method.

To attain the above object, in a third aspect of the present invention, there is provided an apparatus for numerical calculation related to a fluid comprising control means for dividing a flux into a plurality of flux parts according to physical properties thereof, to calculate a conservative equation, and executing time evolution on at least part of the plurality of flux parts using both an upwind difference type leap-frog difference method and a central different type leap-frog difference method.

To attain the above object, in a fourth aspect of the present invention, there is provided an apparatus for numerical calculation related to a fluid comprising control means for dividing a flux into an advection part and a pressure-dependent part, to calculate a conservative equation, executing time evolution on the advection part using an upwind difference type leap-frog difference method based on flow velocity, and executing time evolution on the pressure-dependent part using a central difference type leap-frog difference method.

To attain the above object, in a fifth aspect of the present invention, there is provided a program for causing a computer to execute a method for numerical calculation related to a fluid comprising a dividing module for dividing a flux into a plurality of flux parts according to physical properties thereof, to calculate a conservative equation, and a time evolution executing module for executing time evolution on at least part of the plurality of flux parts using both an upwind difference type leap-frog difference method and a central different type leap-frog difference method.

To attain the above object, in a sixth aspect of the present invention, there is provided a program for causing a computer to execute a method for numerical calculation related to a fluid comprising a dividing module for dividing a flux into an advection part and a pressure-dependent part, to calculate a conservative equation, a first time evolution executing module for executing time evolution on the advection part using an upwind difference type leap-frog difference method based on flow velocity, and a second time evolution executing module for executing time evolution on the pressure-dependent part using a central difference type leap-frog difference method.

To attain the above object, in a seventh aspect of the present invention, there is provided a storage medium storing a program for causing a computer to execute a method for numerical calculation related to a fluid, the program comprising a dividing module for dividing a flux into a plurality of flux parts according to physical properties thereof, to calculate a conservative equation, and a time evolution executing module for executing time evolution on at least part of the plurality of flux parts using both an upwind difference type leap-frog difference method and a central different type leap-frog difference method.

To attain the above object, in an eighth aspect of the present invention, there is provided a storage medium storing a program for causing a computer to execute a method for numerical calculation related to a fluid, the program comprising a dividing module for dividing a flux into an advection part and a pressure-dependent part, to calculate a conservative equation, a first time evolution executing module for executing time evolution on the advection part using an upwind difference type leap-frog difference method based on flow velocity, and a second time evolution executing module for executing time evolution on the pressure-dependent part using a central difference type leap-frog difference method.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

First, a description will be given of a first embodiment according to the present invention with reference to FIGS. 1 to 7.

Equation (1) given below is a one-dimensional basic equation for a compressible fluid. In Equation (1), symbol U designates a conserved quantity determined from fluid density $\rho$, momentum density $\rho \mu$, and total energy e per unit volume, and symbol F designates a flux. Here, the term "flux" refers to a quantity per unit time and unit volume, as represented by Equation (3) given below. Equation (1) represents that the sum or balance of time-variation of the conserved quantity and the flux is conserved.

Equation (2) given below is a formula for determining the conserved quantity U from the fluid density $\rho$, the momentum density $\rho \mu$, and the total energy e per unit volume.

Equation (3) is a formula for determining the flux F.

ONE-DIMENSIONAL BASIC EQUATION $$\frac{\partial U}{\partial t} + \frac{\partial F}{\partial x} = 0 \tag{1}$$

CONSERVED QUANTITY $$U = \begin{bmatrix} \rho \\ \rho u \\ e \end{bmatrix} \tag{2}$$

X-DIRECTION FLUX $$F = Uu + K + D = \begin{bmatrix} \rho \\ \rho u \\ e \end{bmatrix} u + \begin{bmatrix} 0 \\ p \\ pu \end{bmatrix} + \begin{bmatrix} 0 \\ -\tau_{xx} \\ -\tau_{xx}u - \kappa T_x \end{bmatrix} \tag{3}$$

Figure 1:
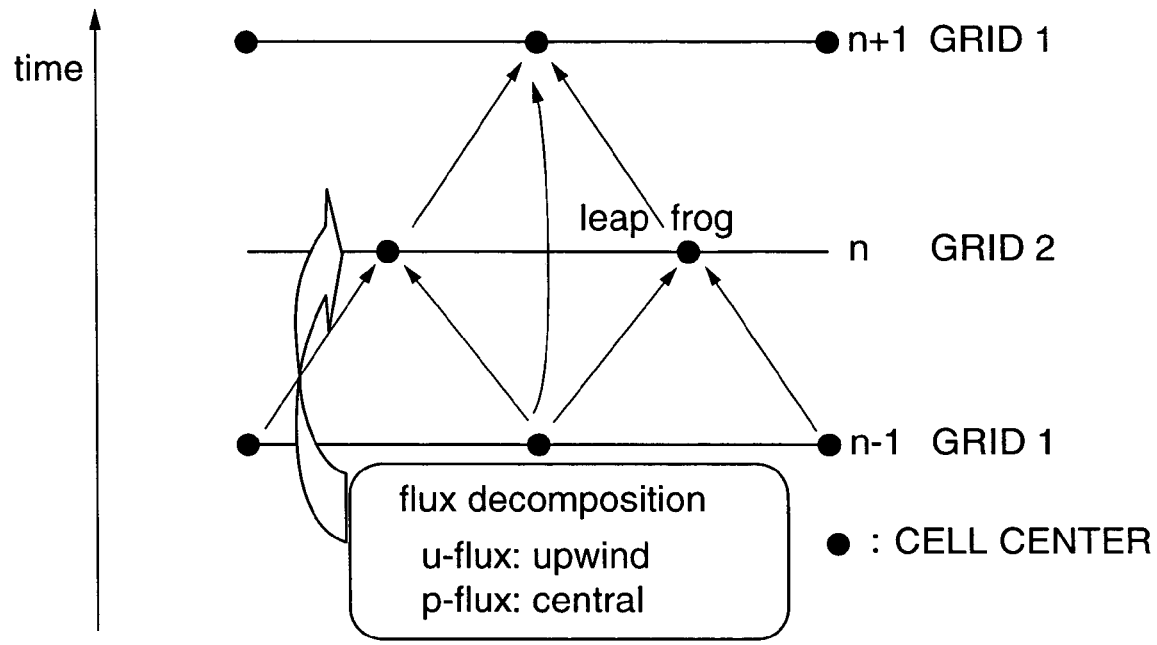
FIG. 1 is a diagram showing the concept of a method for numerical calculation related to a compressible fluid according to a first embodiment of the present invention.

FIG. 1 is a diagram showing the concept of a method for numerical calculation related to a fluid according to the first embodiment of the present invention. The method according to the present embodiment uses a central difference grid. However, in the present embodiment, the flux F is evaluated according to Equation (3), by dividing the flux F into an advection part $U\mu$, a pressure-dependent part K, and a dissipation part D, applying an upwind difference according to the direction of flow velocity at an evaluation point for the advection part $U\mu$, and applying a value obtained by a calculation using a central difference for the pressure-dependent part K. For the dissipation part D, the flux F is evaluated using an explicit method or an implicit method.

Figure 2A:
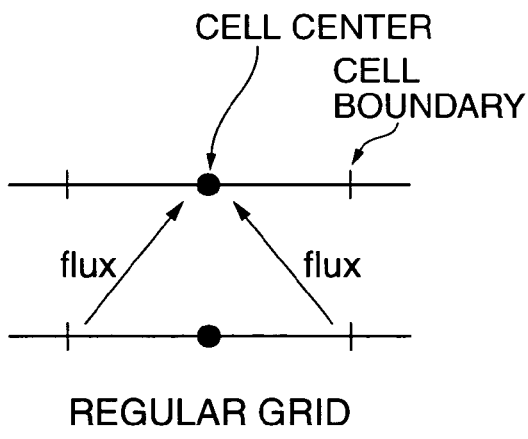
FIG. 2A is a diagram showing the concept of a regular grid applied to the method for numerical calculation in FIG. 1.
Figure 2B:
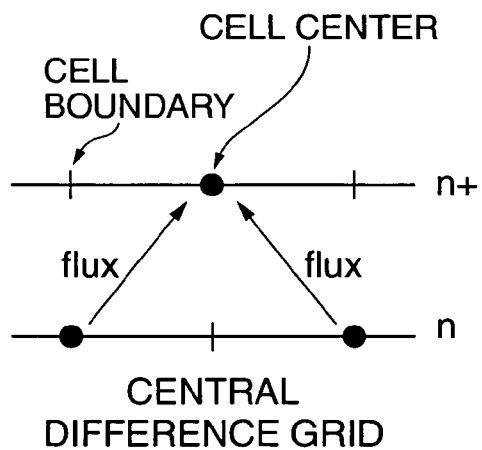
FIG. 2B is a diagram similar to FIG. 2A, showing the concept of a central difference grid applied to the method for numerical calculation in FIG. 1.

FIGS. 2A and 2B are diagrams showing the concept of grids applied to the method for numerical calculation in FIG. 1. Specifically, FIG. 2A shows a one-dimensional regular grid, and FIG. 2B shows a one-dimensional central difference grid.

While in the regular grid in FIG. 2A, the cell center and the cell boundary are fixed in position, in the central difference grid in FIG. 2B, which is of a dual grid system, the cell center and the cell boundary move by half a mesh every one time step. In the regular grid, the conserved quantity U is defined at the cell center, and the flux F is evaluated at the cell boundary. In the central difference grid, the position at which the conserved quantity U is defined and the position at which the flux F is evaluated are identical.

Now, a description will be given of a calculation procedure according to the method for numerical calculation in FIG. 1 with reference to FIGS. 3 and 4.

Figure 3:
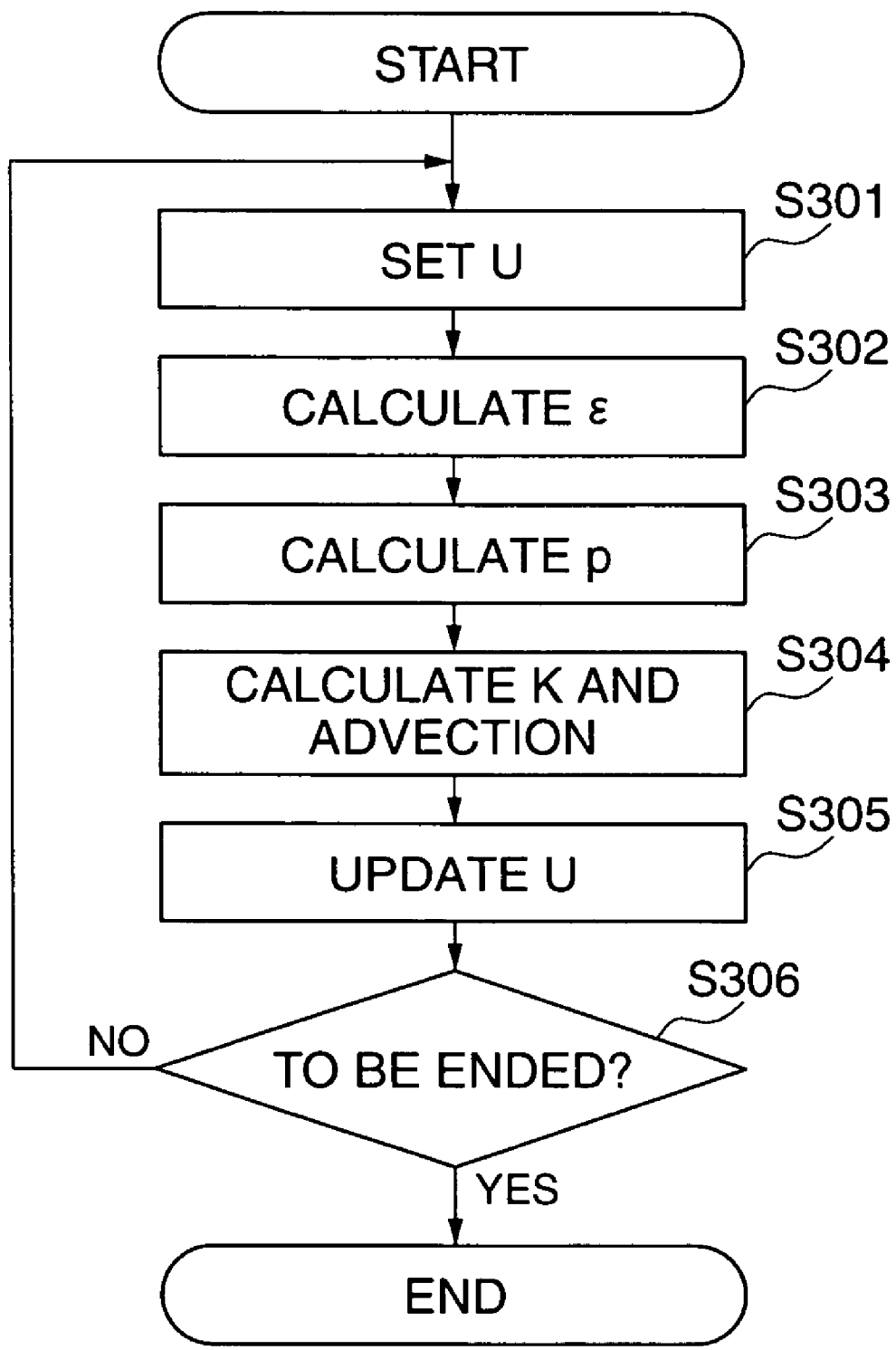
FIG. 3 is a flowchart showing a calculation procedure according to the method for numerical calculation in FIG. 1.
Figure 4:
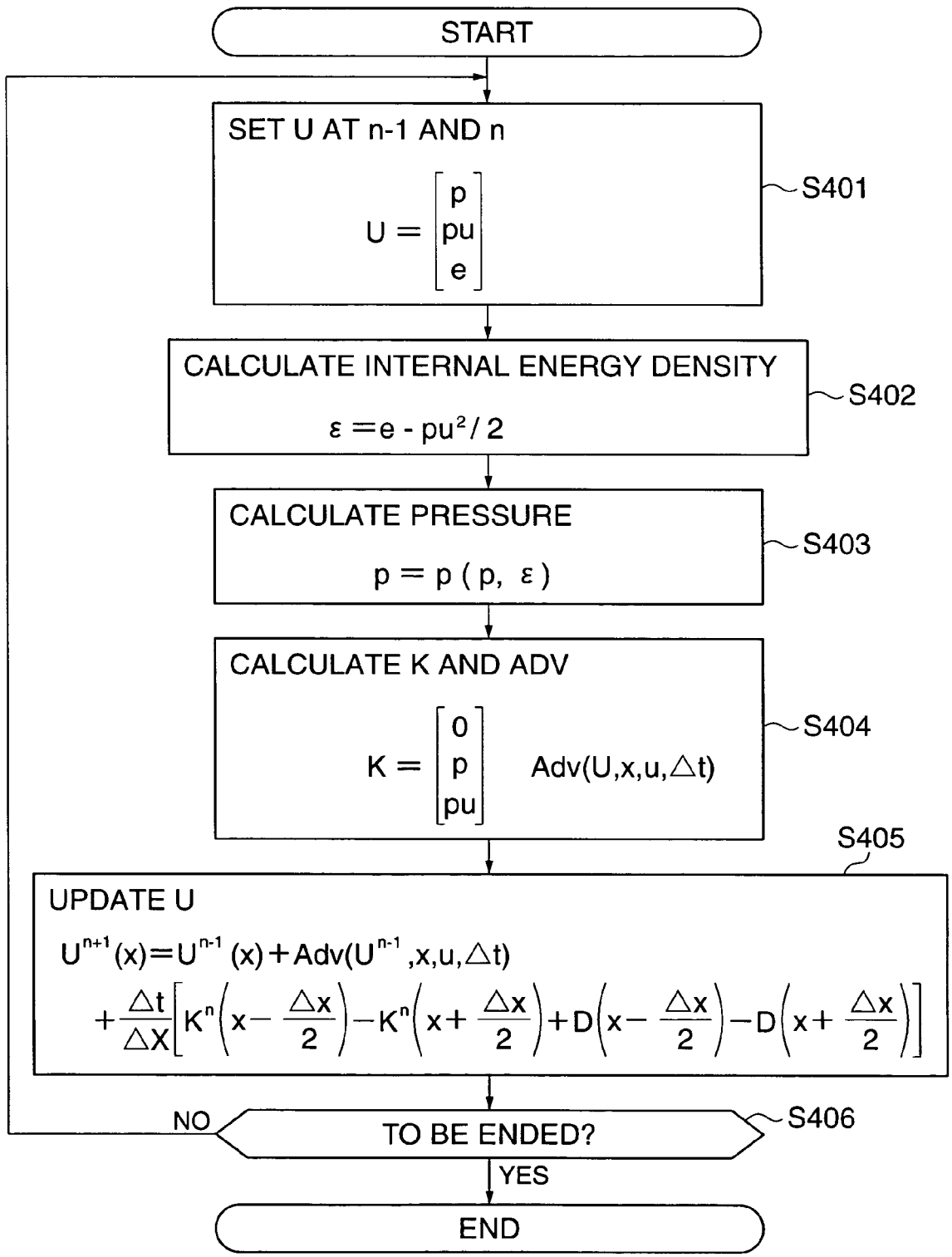
FIG. 4 is a flowchart showing details of the calculation procedure according to the method for numerical calculation in FIG. 1.

FIGS. 3 and 4 are flowcharts showing the calculation procedure according to the method for numerical calculation in FIG. 1.

First, in a step S301, initialization of the conserved quantity U is carried out at a time point n and a time point n−1 (step S401 in FIG. 4).

Then, in a step S302, internal energy density $\epsilon$ is calculated (step S402 in FIG. 4).

Then, in a step S303, pressure p at the time point n is calculated (step S403 in FIG. 4).

Then, in a step S304, the pressure-dependent part K at the time point n and the advection part Adv (advection part Uµ) at the time point n−1 are calculated (step S404 in FIG. 4).

To determine an upwind difference for calculation of the advection part Adv, not only a primary upwind difference scheme but also a high resolution scheme such as TVD (Total Variation Diminishing), ENO (Essentially Non Oscillatory), or PP (Positively Preserving) can be used.

Then, in a step S305 (step S405 in FIG. 4), the conserved quantity U is updated into a value at a time point n+1, that is, time evolution is carried out. Here, the value of the central difference is used for the pressure-dependent part K of the flux, the value of the upwind difference is used for the advection part Adv, and a value at the time point n−1 (obtained by the explicit method) or a value at the time point n+1(obtained by the implicit method) is used for the dissipation part D.

In this way, the time evolution is carried out by a central difference type leap-frog method using the central difference value for the pressure-dependent part K of the flux, and by an upwind difference type leap-frog method using the upwind difference value for the advection part Adv of the flux.

According to the method of the present embodiment, the central difference value is applied in calculating the pressure-dependent part K of the flux F, which makes it unnecessary to calculate the ultrasonic speed for evaluation of the pressure as in the AUSM scheme, and hence can be used as a generalized calculation method not relying upon an equation of state.

Further, in the case where the stability condition of the calculations is so severe that a numerical vibration occurs, artificial viscosity terms may be introduced into formulas to satisfy the calculation stability condition.

Figure 5:
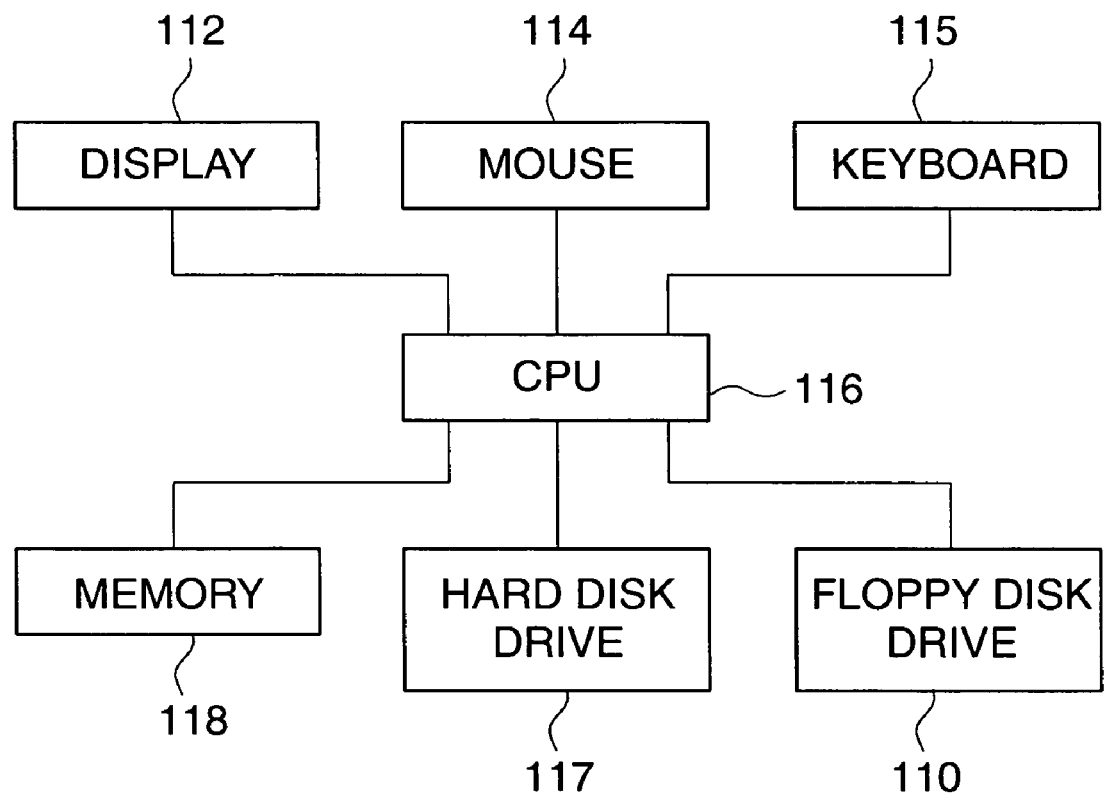
FIG. 5 is a block diagram showing the arrangement of a computer for implementing the method for numerical calculation in FIG. 1.

FIG. 5 is a block diagram showing the arrangement of a computer (numerical calculation apparatus) that can be used to implement the method for numerical calculation according to the present embodiment.

As shown in FIG. 5, the computer constitutes a system which is comprised of an arithmetic processing section composed of a CPU 116, a memory 118, and others, a storage section composed of a hard disk drive 117 and a floppy (registered trademark) disk drive 110, an input section composed of a keyboard 115, a mouse 114, and others, and an output display section composed of a display 112 and others.

This computer loads a program corresponding to the flow-charts in FIGS. 3 and 4 into the memory 118, carries out predetermined arithmetic processing according to the formulas shown in FIG. 4 based on the shape of a required calculation region reserved on the memory 118, lattice point coordinates, and physical quantities, which are input by appropriate methods, in the calculation region on the memory 118, and writes the resulting physical quantity values on the region into the hard disk of the hard disk drive 117 for example, to display them on the display 112.

Figure 6:
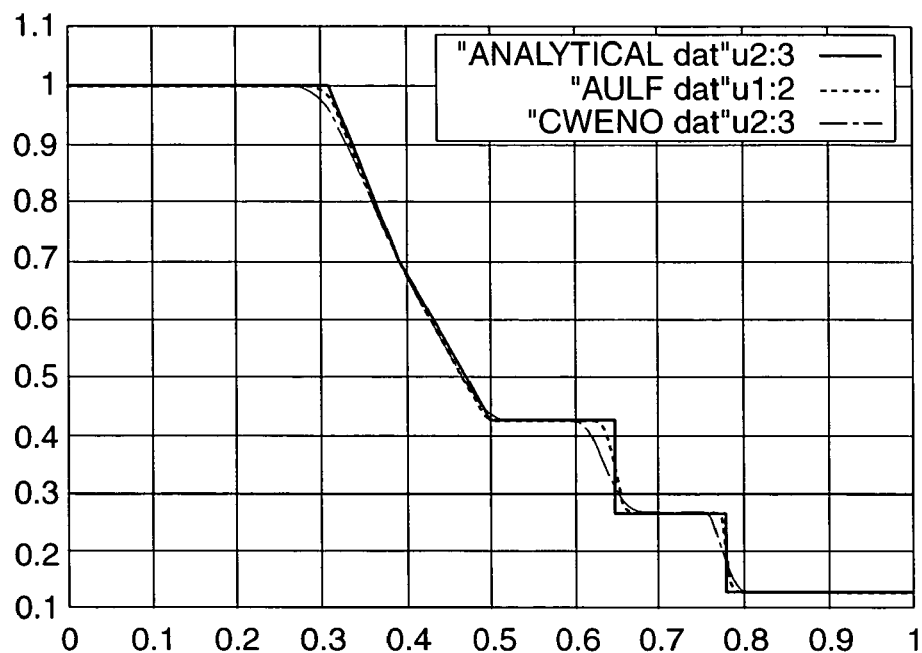
FIG. 6 is a graph showing results of calculations by the method for numerical calculation in FIG. 1 and results of calculations by a central difference scheme, for comparison.

FIG. 6 is a graph showing results of calculations by the method for numerical calculation according to the present embodiment and results of calculations by a CWENO scheme as a central difference scheme, for comparison. The graph in FIG. 6 shows examples of results of calculations by the method according to the present embodiment and by the CWENO scheme to solve a shock tube problem as a typical benchmark test on a compressible fluid.

Figure 7:
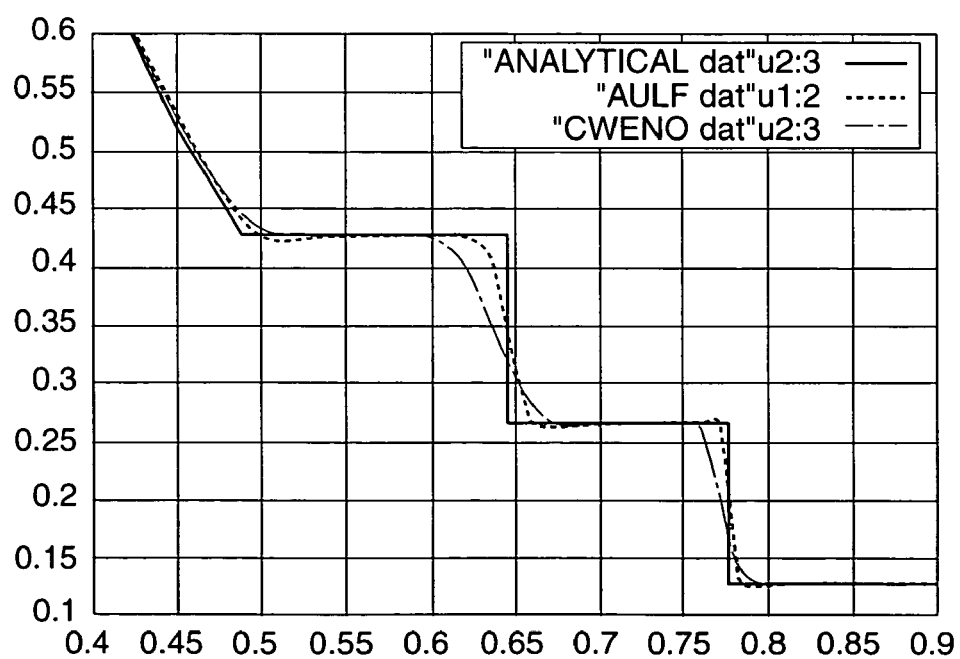
FIG. 7 is a graph showing on an enlarged scale a part of the graph in FIG. 6.

FIG. 7 is a graph showing on an enlarged scale a part of the graph in FIG. 6.

In FIGS. 6 and 7, the continuous line shows the analytical results, the broken line shows the results of calculations by the method according to the present embodiment, and the chain line shows the results of calculations by the results of calculations by the CWENO scheme.

As is clear from FIGS. 6 and 7, the results of calculations by the method according to the present embodiment show a less degree of numerical diffusion and a higher resolution.

As described in detail above, according to the present embodiment, the merits of an upwinding solution (upwind difference type leap-frog method) and the merits of a non-upwinding solution (central difference type leap-frog method) are utilized. As a result, the method according to the present embodiment can be used as a generalized numerical calculation method which is efficient and less liable to cause numerical diffusion and does not rely upon the functional form of an equation of state.

Moreover, according to the present embodiment, not only an equation of state for an ideal gas but also a van der Waals equation of state or a like equation of state can be used without changing the calculation scheme.

Next, a second embodiment of the present invention will be described with reference to FIG. 8.

Equation (4) given below is a two-dimensional basic equation for a compressible fluid. In Equation (4), symbol U designates a conserved quantity determined from fluid density $\rho$, x-direction momentum density $\rho\mu$, y-direction momentum density $\rho\upsilon$, and total energy e per unit volume, symbol F designates an x-direction flux, and symbol G designates a y-direction flux. Here, the term "x-direction flux" refers to a quantity per unit time and unit volume, as represented by Equation (6) given below. Equation (4) represents that the sum or balance of time-variation of the conserved quantity and the fluxes is conserved.

Equation (5) given below is a formula for determining the conserved quantity U from the fluid density $\rho$, the momentum densities $\rho\mu$, $\rho\upsilon$, and the total energy e per unit volume.

Equation (6) is a formula for determining the x-direction flux F.

Equation (7) is a formula for determining the y-direction flux F.

TWO-DIMENSIONAL BASIC EQUATION $$\frac{\partial U}{\partial t} + \frac{\partial F}{\partial x} + \frac{\partial G}{\partial y} = 0 \qquad (4)$$

CONSERVED QUANTITY $$U = \begin{bmatrix} \rho \\ \rho u \\ \rho v \\ e \end{bmatrix} \qquad (5)$$

X-DIRECTION FLUX $$F = \begin{bmatrix} \rho \\ \rho u \\ \rho v \\ e \end{bmatrix} u + \begin{bmatrix} 0 \\ p \\ 0 \\ pu \end{bmatrix} + \begin{bmatrix} 0 \\ -\tau_{xx} \\ -\tau_{xy} \\ -\tau_{xx}u - \tau_{xy}v - \kappa T_x \end{bmatrix} \qquad (6)$$

Y-DIRECTION FLUX $$G = \begin{bmatrix} \rho \\ \rho u \\ \rho v \\ e \end{bmatrix} v + \begin{bmatrix} 0 \\ 0 \\ p \\ pv \end{bmatrix} + \begin{bmatrix} 0 \\ -\tau_{yx} \\ -\tau_{yy} \\ -\tau_{yx}u - \tau_{yy}v - \kappa T_y \end{bmatrix} \qquad (7)$$

Figure 8A:
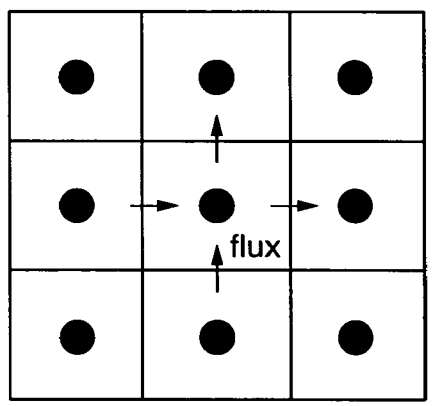
FIG. 8A is a diagram showing the concept of a regular grid applied to a method for numerical calculation related to a compressible fluid according to a second embodiment of the present invention.
Figure 8B:
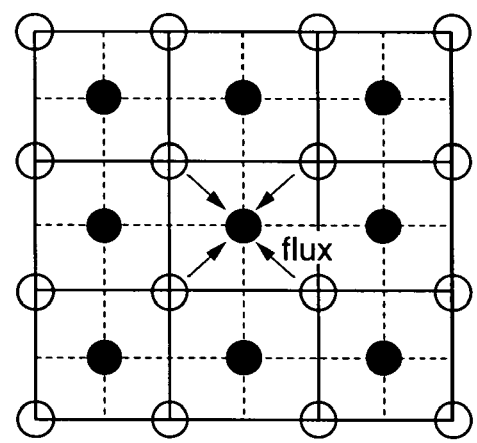
FIG. 8B is a diagram similar to FIG. 8A, showing the concept of a central difference grid applied to the method for numerical calculation according to the second embodiment.

FIGS. 8A and 8B are diagrams showing the concept of two-dimensional grids applied to the method for numerical calculation according to the second embodiment. Specifically, FIG. 8A shows a two-dimensional regular grid, and FIG. 8B shows a two-dimensional central difference grid.

In the two-dimensional grids, as is the case with the one-dimensional grids in the first embodiment described above, while in the regular grid, the cell center and the cell boundary are fixed in position, in the central difference grid, the cell center and the cell boundary move by half a mesh every one time step (not only in the x-direction but also in the y-direction).

Further, in the two-dimensional grids, as is the case with the one-dimensional grids, in the regular grid, the conserved quantity U is defined at the cell center, and the fluxes F and G are evaluated at the cell boundary, and in the central difference grid, the position at which the conserved quantity U is defined and the position at which the fluxes F and G are s evaluated are identical.

To apply the method according to the present invention to a two-dimensional grid, the x-direction and y-direction fluxes F, G are evaluated according to Equations (6) and (7), by dividing each of the fluxes F, G into an advection part, a pressure-dependent part, and a dissipation part, applying an upwind difference according to the direction of flow velocity at an evaluation point for each advection part, and applying a value obtained by a calculation using a central difference for each pressure-dependent part. For the dissipation parts, the fluxes F, G are evaluated using the explicit method or the implicit method.

The above processing is identical with that used by the first embodiment described above, except that the y-direction components are added in the present embodiment, providing substantially the same effects as in the first embodiment. The method according to the present invention can be applied to a case where an external force such as gravity is exerted upon the fluid equation system, as well as to a three-dimensional grid.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and the storage medium in which the program code is stored constitute the present invention.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the above program has only to realize the functions of either of the above described embodiments on a computer, and the form of the program may be an object code, a program code executed by an interpreter, or script data supplied to an OS.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network from another computer, a database or the like, not shown, connected to the Internet, a commercial network, a local area network, or the like.

What is claimed is:

1. A computer implemented method for numerical calculation to analyze a fluid, comprising:
    a setting step of setting conserved quantities for the fluid at time points n−1 and n;
    a dividing step of dividing a flux of the fluid into a plurality of parts including an advection part and a pressure-dependent part, to calculate a conservative equation;
    a first calculation step of calculating a value of the advection part at the time point n−1 using an upwind difference type leap-frog difference method based on flow velocity;
    a second calculation step of calculating a value of the pressure-dependent part at the time point n using a central difference type leap-frog difference method;
    a third calculation step of calculating the conserved quantity at time point n+1 based on the values of the advection part at the time point n−1 calculated using the upwind difference type leap-frog difference method and the pressure-dependent part at the time point n calculated using the central difference type leap-frog difference method; and
    a display step of displaying a graph representing the result of the calculation in at least one of said first, second, and third calculation steps.

2. An apparatus for numerical calculation to analyze a fluid, comprising:
    a setting means for setting conserved quantities for the fluid at time points n−1 and n;
    dividing means for dividing a flux of the fluid into a plurality of parts including an advection part and a pressure-dependent part, to calculate a conservative equation,
    calculation means for calculating a value of the advection part at the time point n−1 using an upwind difference type leap-frog difference method based on flow velocity, for calculating a value of the pressure-dependent part at the time point using n a central difference type leap-frog difference method; and calculating the conserved quantity at time point n+1 based on the values of the advection part at the time point n−1 calculated using the upwind difference type leap-frog difference method and the pressure-dependent part at the time point n calculated using the central difference type leap-frog method; and
    a display means for displaying a graph representing the result of the calculation in at least one of said first, second, and third calculation steps.

3. A computer readable medium, storing program instructions modules that wherein executed by a computer, execute an analysis method for numerical calculation to analyze a fluid, wherein the method comprises:
    setting conserved quantities for the fluid at time points n−1 and n;
    dividing a flux of the fluid into a plurality of parts including an advection part and a pressure-dependent part, to calculate a conservative equation;

first calculating a value of the advection part at the time point n−1 using an upwind difference type leap-frog difference method based on flow velocity;

second calculating a value of the pressure-dependent part at the time point n using a central difference type leap-frog difference method;

third calculating the conserved quantity at time point at n+1 based on the values of the advection part at the time point n−1 calculated using the upwind difference type leap-frog difference method and the pressure-dependent part at the time point n calculated using the central difference type leap-frog difference method; and displaying a graph representing the result of the calculation in at least one of said first, second, and third calculation steps.

* * * * *